(No Model.)

F. McCABE.
FAUCET FOR DRAWING LIQUIDS.

No. 282,206. Patented July 31, 1883.

WITNESSES:
Theo. G. Hoster
C. Sedgwick

INVENTOR:
F. McCabe
BY Munn & Co
ATTORNEYS.

UNITED STATES PATENT OFFICE.

FRANK McCABE, OF PROVIDENCE, RHODE ISLAND.

FAUCET FOR DRAWING LIQUIDS.

SPECIFICATION forming part of Letters Patent No. 282,206, dated July 31, 1883.

Application filed December 16, 1882. (No model.)

*To all whom it may concern:*

Be it known that I, FRANK McCABE, of Providence, in the county of Providence and State of Rhode Island, have invented certain new and useful Improvements in Faucets for Drawing Liquids, of which the following is a full, clear, and exact description.

My improvements are specially intended for application to beer-faucets, but may be used with any faucet for drawing liquids, the object being to prevent leakage around the valve when the faucet is open.

Reference is to be had to the accompanying drawings, forming a part of this specification, in which similar letters of reference indicate corresponding parts in all the figures.

Figure 1:
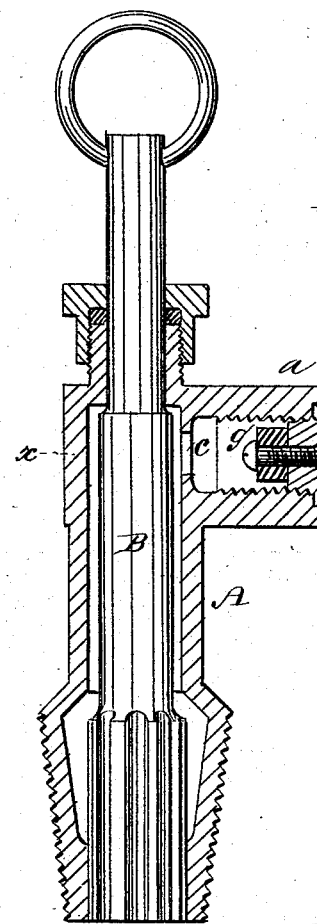
Figure 3:
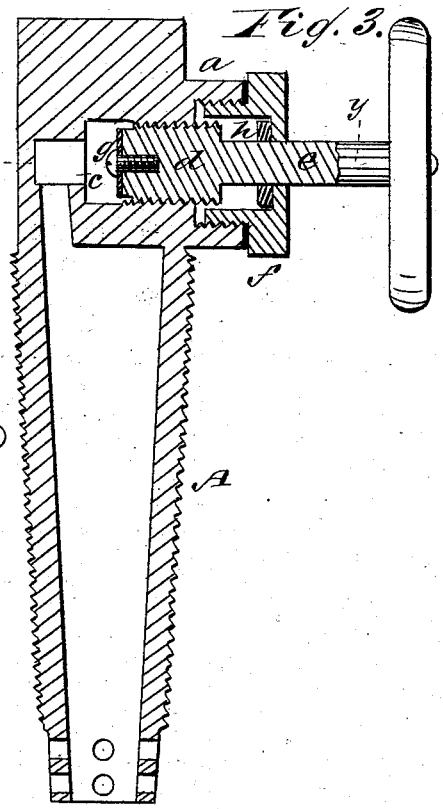
Figure 2:
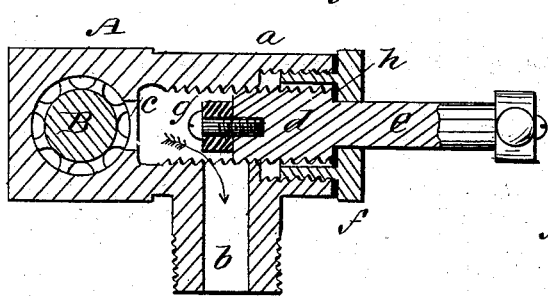
Figure 4:
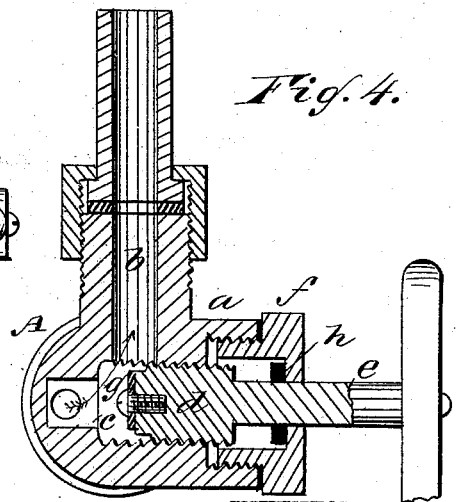

Figure 1 is a longitudinal section of a faucet with my improvements. Fig. 2 is a cross-section on line $x\ x$, Fig. 1. Fig. 3 is a longitudinal section of another style of faucet with my improvements. Fig. 4 is a section on line $y\ y$, Fig. 3.

A is the body or tube of the faucet, formed to screw into the bung-hole of a keg or barrel, and in Figs. 1 and 2 provided with a plunger, B, for forcing the bung inward. $a$ is a tubular boss, formed upon the tube A and constituting the body of the valve proper, this tube or boss $a$ being formed with an outlet, $b$. $c$ is the seat of the valve. $d$ is the valve, consisting of a screw-plug fitted within the tube $a$ and provided with a stem, $e$, that extends through a packing-gland, $f$, at the outer end of the tube $a$. The valve or plug is fitted with a packing-disk, $g$, at its inner end, for closing against the seat $c$, and within the packing-gland $f$ and around the stem $e$ is a packing disk or ring, $h$. When the valve or plug is screwed outward, by turning the stem $e$ the liquid is free to escape to the outlet $b$. In case any liquid passes between the threads of the screw to the space at the outer end of the plug, it is prevented from escaping around the stem by the packing $h$, and when the valve has been fully screwed out, it takes against the packing $h$, so that it is compressed against the stem.

Having thus fully described my invention, I claim as new and desire to secure by Letters Patent—

The combination, with a faucet-body having the boss $a$, outlet $b$, and seat $c$, of the screw-valve $d$, having stem $e$, the packing-gland $f$, the packing-disk $g$, and the ring $h$, as and for the purpose specified.

FRANK McCABE.

Witnesses:
    JOHN MAGEE,
    WM. B. AVERY.